United States Patent
Ohmi et al.

[11] Patent Number: 5,917,742
[45] Date of Patent: Jun. 29, 1999

[54] SEMICONDUCTOR ARITHMETIC CIRCUIT

[75] Inventors: Tadahiro Ohmi; Makoto Imai; Koji Kotani, all of Miyagi-ken, Japan; Tadashi Shibata, 5-2, Nihondaira, Taihaku-ku, Sendai-shi, Miyagi-ken 982-02, Japan

[73] Assignee: Tadashi Shibata, Japan

[21] Appl. No.: 08/806,744

[22] Filed: Feb. 27, 1997

[30] Foreign Application Priority Data

Mar. 13, 1996 [JP] Japan .................................. 8-085948

[51] Int. Cl.[6] ............................... G06G 7/00; G06F 7/00
[52] U.S. Cl. ................................. 364/807; 364/746.2
[58] Field of Search ................................. 364/502, 807, 364/768, 773, 746.2

[56] References Cited

U.S. PATENT DOCUMENTS 4,140,920  2/1979  Dao et al. .............................. 364/773
4,390,962  6/1983  Current .................................. 364/768

*Primary Examiner*—Tan V. Mai
*Attorney, Agent, or Firm*—Randall J. Knuth

[57] ABSTRACT

A semiconductor arithmetic circuit which realizes multiple-item addition processing at high speed and with a small surface areas The semiconductor arithmetic circuit adds a plurality of data expressed in binary format which is provided with terminals for the simultaneous input of the plurality of data, a mechanism for conducting a batch addition operation with respect to all the bits of the plurality of data, and for generating an analog or multi-valued signal having a linear relationship with the results of this addition and a mechanism for converting the analog or multi-valued signal to a digital signal. The plurality of data comprise bit data signals, and 4 or more of these are subjected to batch addition. A plurality of bit groups including a plurality of connected bits are also subjected to batch addition.

8 Claims, 14 Drawing Sheets

Fig. 14

| BASIC ELEMENT | OUTPUT/INPUT | NUMBER OF STAGE | SPEED | TR.NUMBER | CAP.SIZE |
|---|---|---|---|---|---|
| FULL ADDER | 2/3 | 8 | 8 [ns] | 91,860 | |
| BIT BATCH ADDER | 3/7 | 4 | 12 [ns] | 13,728 | 59,968 |
| 3-BIT 9-LINE BATCH ADDER | 2/9 | 2 | 3 [ns] | 36,288 | 285,768 |

SEMICONDUCTOR ARITHMETIC CIRCUIT

FIELD OF THE INVENTION

The present invention relates to a semiconductor arithmetic circuit. In particular, the present invention relates to a semiconductor arithmetic circuit having a high speed and small scale circuit structure in the fields of multiple item addition operations and multiple line addition in calculators.

BACKGROUND TECHNOLOGY

Addition in semiconductor arithmetic circuits was conducted, in conventional binary digital processing, by partitioning inputted data (in this specification, 'data' refers to a complete inputted item comprising a plurality of bits) by the data bit ('bit' indicates a 1-place binary number), and processing this; this was realized by using full adder elements.

Since full adder elements are elements having 3 inputs and 2 outputs, if one of the inputs is used as a carry signal, it is possible to construct a system capable of processing 2 item calculations without difficulty.

However, in the case of addition of multiple items, it is necessary to combine full adders in a number of stages, and it is impossible to avoid an increase in complexity and scale of the circuits. Multiple item addition processing is required in a variety of fields; however, in particular, as multiplication of four rules operations is also realized by multiple rounds of addition, such multiple item addition calculations are necessary in operational processing, and the development of a multiple item addition basic element which can take the place of the full adder has been desired.

The present invention has as an object thereof to provide a semiconductor arithmetic circuit which is capable of realizing multiple item addition processing at high speeds or using a small surface area.

DISCLOSURE OF THE INVENTION

The semiconductor arithmetic circuit of the present invention is a circuit which conducts the addition of data expressed in binary form, which is provided with: a mechanism for generating an analog signal, having terminals for the simultaneous input of data, which conducts batch addition operations with respect,to all the bits of this data, and which generates an analog signal having a linear relationship to the results of this addition; and with a mechanism for converting the analog signal into a digital signal.

BRIEF DESCRIPTION OF THE DRAWINGS

FIG. 2(a) shows the full adder which was conventionally employed, and FIG. 2(b) shows a batch adder of an embodiment.

FIG. 14 shows the parameters by basic element of the adders of a 64-bit multiplier.

BEST MODE FOR CARRYING OUT THE INVENTION

Hereinbelow, the present invention will be explained in detail based on embodiments; however, it is of course the case that the present invention is in no way limited to the embodiments described.

In particular, an example will be shown which uses a neuron MOS transistor as an element which conducts batch addition; however, any circuit element may be employed insofar as it generates an analog signal having a linear relationship with the results of the addition, so that for example, a circuit which generates an analog current having a linear relationship with the results of the addition may be employed.

Figure 1:
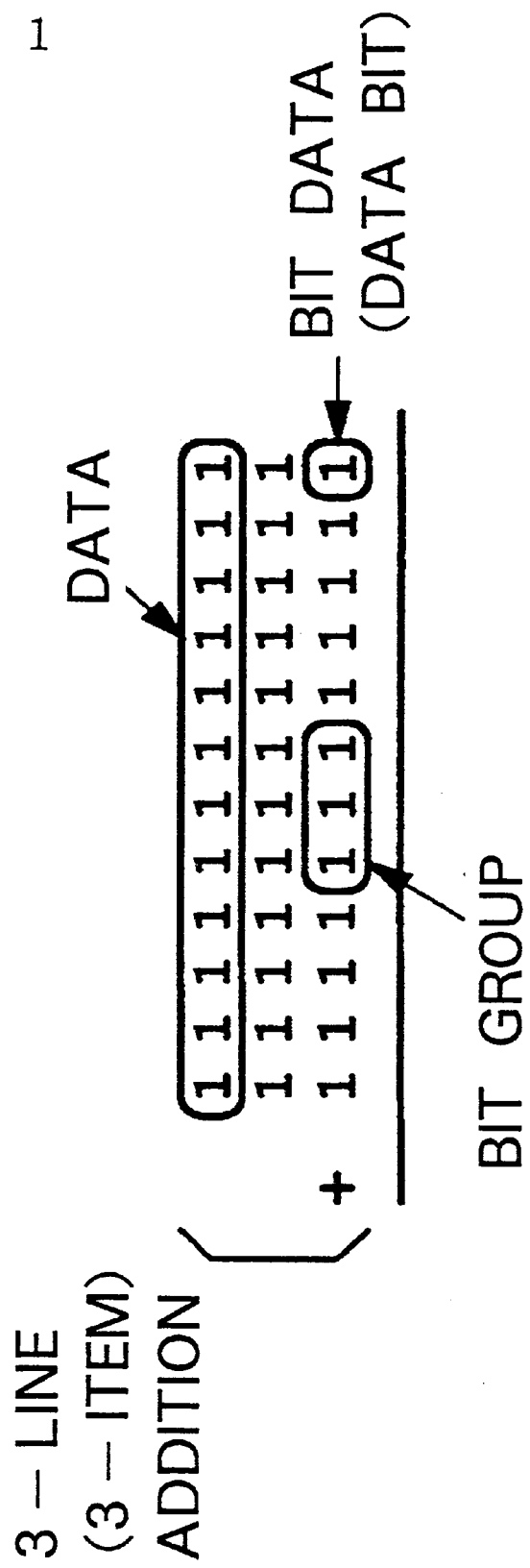
FIG. 1 shows the concepts of data, bit data, and bit groups.

Furthermore, the concepts underlying the words data expressed in binary format, bit data of the data, and bit group comprising a plurality of connected bit data, which are employed in the present invention are shown in FIG. 1.

Figure 2:
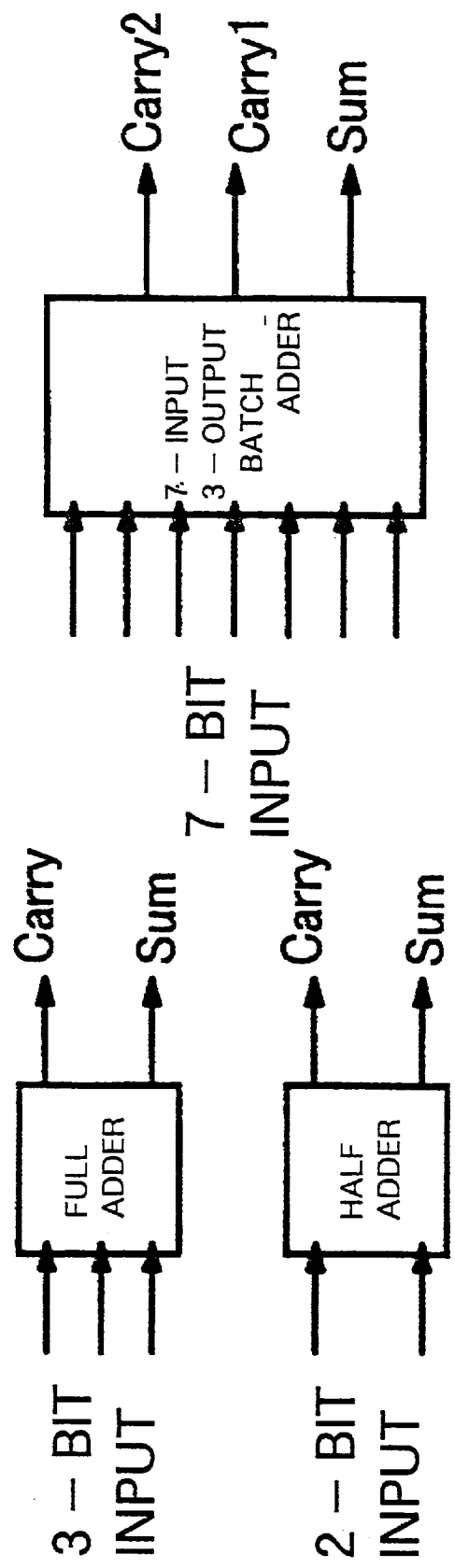
FIG. 2 is a conceptual diagram of an adder.

FIG. 2 shows the concept of a conventional adder and a batch adder of the present invention. Conventionally, as shown in FIG. 2(a), only those circuits existed which outputted 1 carry (carry signal) and 1 addition result in response to the input of 2- or 3-bit data; however, in the present embodiment (FIG. 2(b)), the circuit structure is such that 7 bit data are added as a batch and a total of 3 digital signals are outputted, so that the circuit adds 4 or more inputted items.

Figure 3:
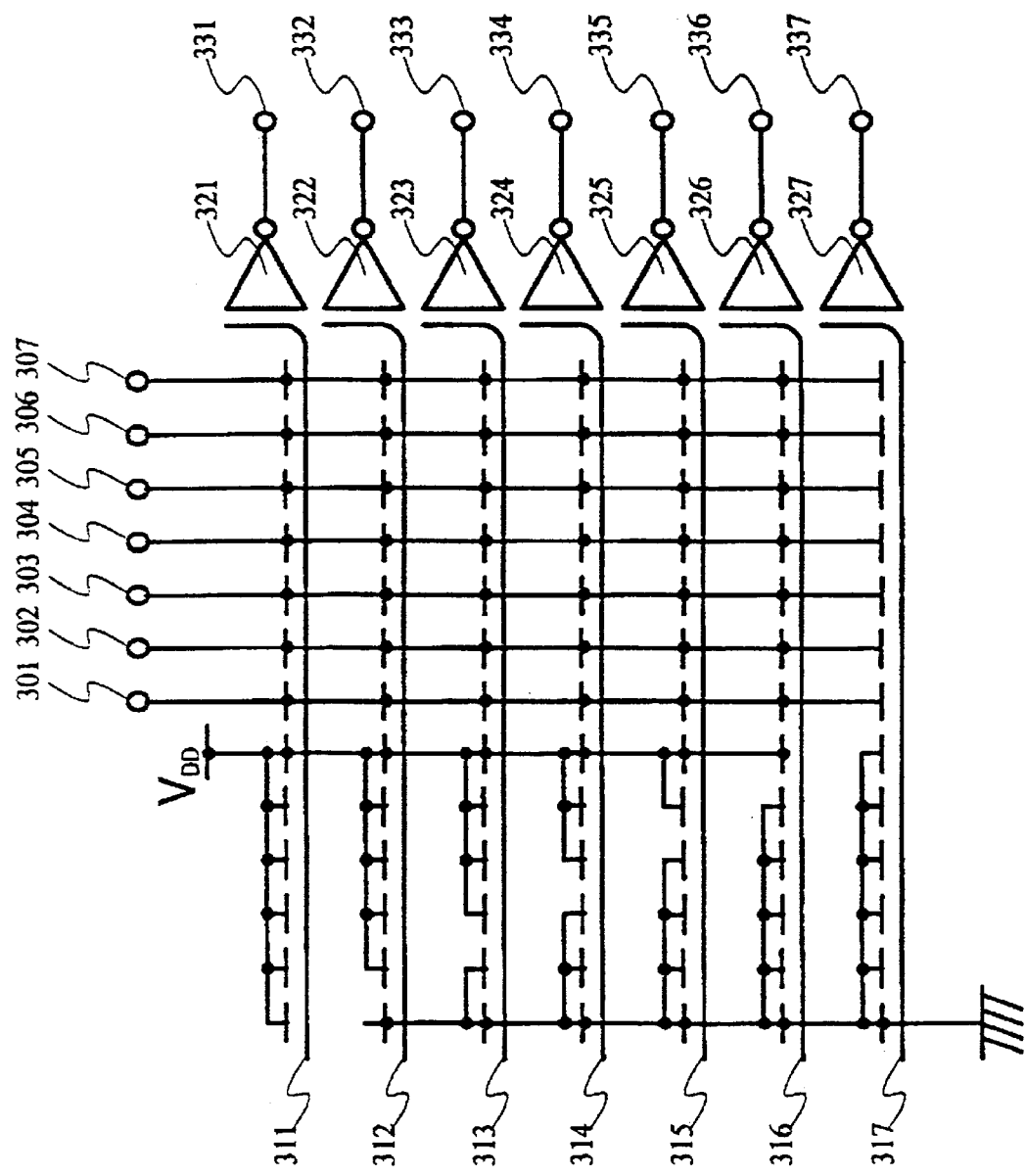
FIG. 3 is a structural diagram of a circuit showing a first embodiment of the present invention.

FIG. 3 is a circuit diagram showing the details of FIG. 2(b).

This circuit conducts the batch addition of bit of data of 7 inputted bit data. The circuit expresses the results of the addition as the number of terminals outputing a binary value of '0' among the 7 output terminals 331, 332, 333, 334, 335, 336, and 337. The inputted bit data are applied to the 7 input terminals 301, 302, 303, 304, 305, 306, and 307 at the same time. These terminals are coupled with the floating electrodes 311, 312, 313, 314, 315, 316, and 317 which works as a means for generating an analog signal via capacities of a predetermined size, and an analog voltage (an offset voltage may be present) given by the addition average of the inputted bit data is produced in the floating electrodes. These floating electrodes form the gate electrodes of neuron MOS transistors (inventors: Tadashi Shibata, Tadahiro Ohmi, Japanese Patent Application, First Publication, No. HEI 3-6679, and Japanese Patent Application, First Publication, No. HEI 4-816971), and these neuron MOS transistors comprise neuron MOS inverter circuits 321, 322, 323, 324, 325, 326, and 327, which have differing setting threshold values. These neuron MOS inverters works as a means for converting analog signal to digital signal. The setting threshold value is set by applying $V_{DD}$ or the GND potential to the six terminals which are parallel to the input terminals. The circuit structure is such that if the result of the batch addition (0–7) is 1 or more, then neuron MOS inverter circuit 321 outputs a value of '0' to output terminal 331, while if the results of the batch addition are 2 or greater, inverter circuit 322 outputs a value of '0' to 332, and this continues with inverter circuits 323–326, and if the results of the batch addition are 7 or greater, then inverter circuit 327 outputs a value of '0' to 337.

Figure 4:
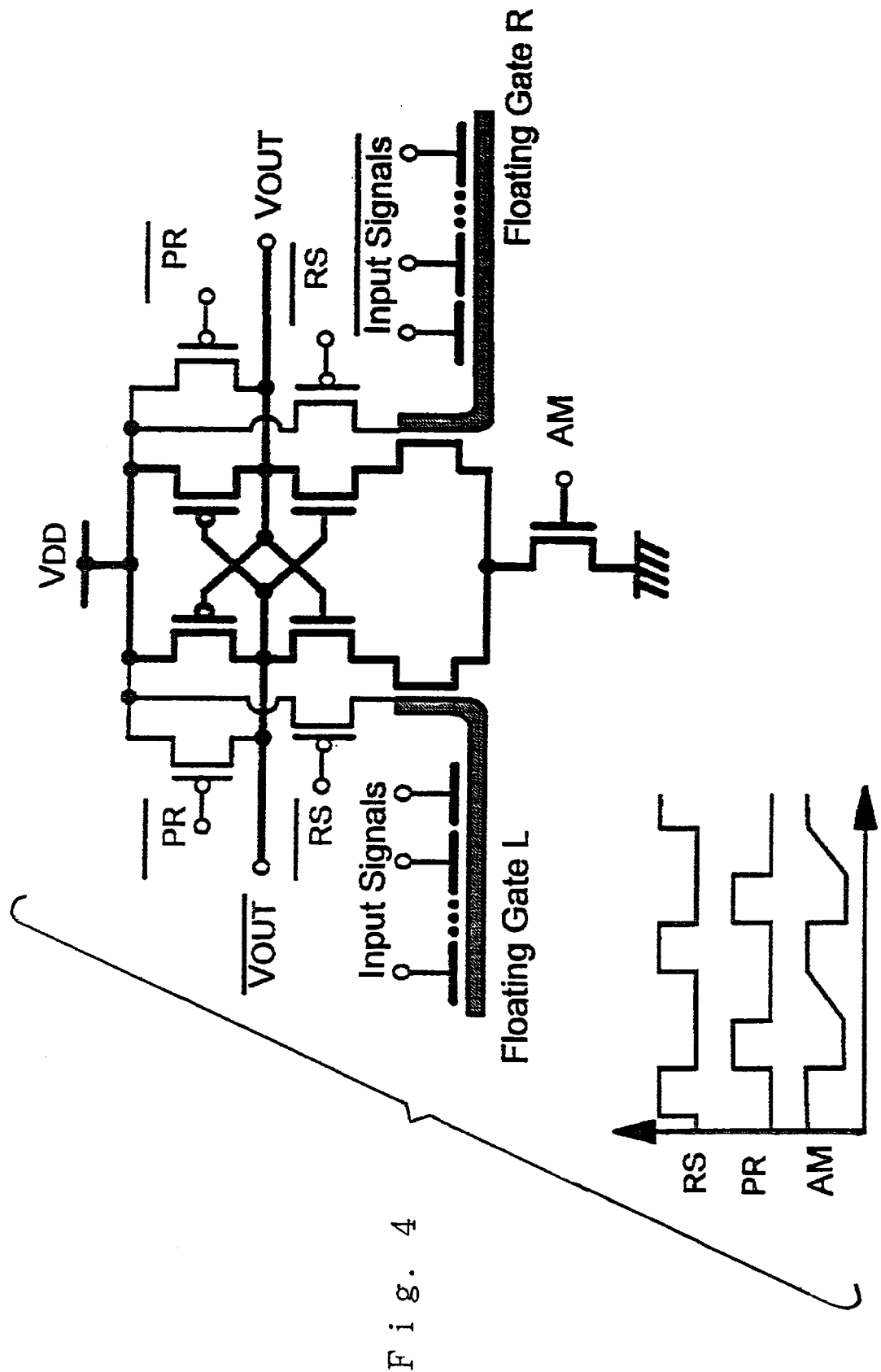
FIG. 4 is a circuit diagram of a sense amplifier type neuron MOS logical value circuit which may be employed as a neuron MOS logic decision circuit.

In the present embodiment, the circuit structure is such that the result of the addition is converted to digital signal and expressed as the number of terminals outputting a binary value of '0' among the 7 output terminals; however, if the circuit structure is such that the output is digital signal, for example, even if the addition result within a range of 0–7 is outputted as a 3-bit binary number, the result may be expressed as a discrete value having a value from 0 to 7. Furthermore, in the present embodiment, a neuron MOS inverter circuit was employed as a means for converting analog signal or multi valued sign to digital signal; however, any circuit structure may be employed insofar as it conducts digital signal conversion in response to a setting threshold value; for example, a neuron MOS sense amplifier type circuit (inventors: Koji Kotani, Tadashi Shibata, Tadahiro Ohmi, Japanese Patent Application No. HEI 7-2441; an embodiment is shown in FIG. 4) may be employed as a operation circuit wherein an output of a first inverter circuit is connected with an input of a second inverter circuit at a first connection point, an output of the second inverter is connected to an input of the first inverter at a second connection point, and a potential difference is generated between the first and the second connection points, based on a voltage signal generated in the floating electrode. Furthermore, in the present embodiment, the setting threshold value was set by applying $V_{DD}$ or the GND potential to the additional 6 terminals; however, an input subtraction function, which resets through at least one switch the floating gate to a predetermined voltage, may also be employed, and the setting threshold value may also be set by the potential difference applied to the left and right nodes of the neuron MOS sense amplifier type circuit.

Second Embodiment

A second embodiment of the present invention is a semiconductor arithmetic circuit which treats a plurality of bit groups, comprising a plurality of connected bits, as a batch and adds these.

In the present embodiment, a semiconductor arithmetic circuit will be described which conducts the batch addition of up to 9 items by treating inputs and outputs as bit group of 3 connected bit data; however, the grouping is not limited to groups of 3-bits in the present invention, so that for example, grouping into 2-bit groups or 4-bit groups is also possible. Furthermore, the reason for using the batch addition of 9 items as an example is that this is the most effective number of items if 3-bit grouping is conducted; the addition of any number of items may be conducted for the purposes of comparison with the conventional technology, as long as the batch addition of a plurality of items is conducted.

What is meant by a 3-bit group batch adding circuit is a circuit in which the various input and output bit data of the batch adding circuit shown in FIG. 2(b) are replaced with bit groups. The effects of this grouping are such that since it is possible to restrict the number of output signals in comparison with a 1-bit data batch adder, effects are particularly pronounced in the case of addition of small numbers of expressed in binary format.

Figure 5:
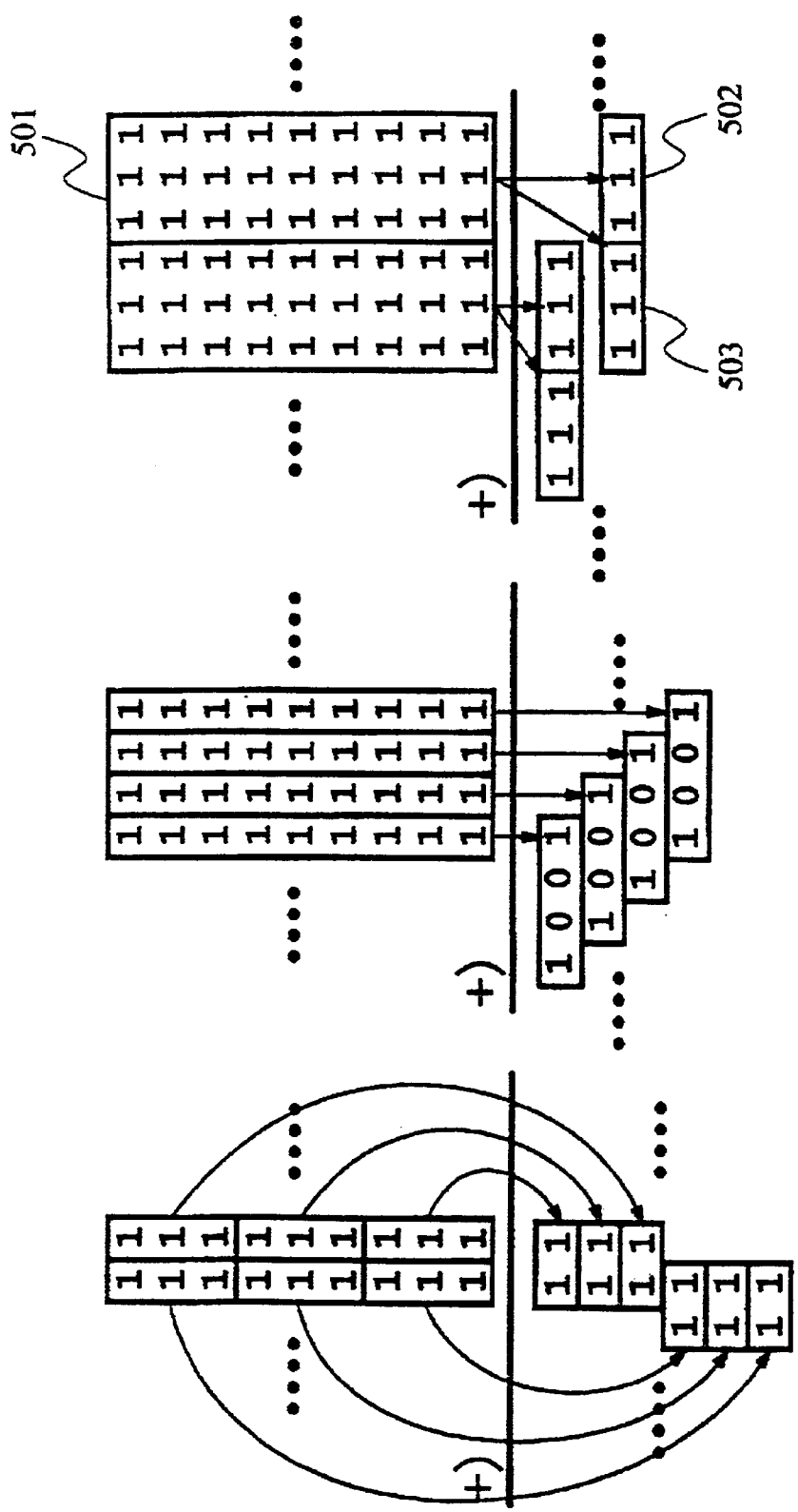
FIG. 5 shows the differences in the outputted numbers when using basic elements in the addition of 9-line data. (a) shows the case in which a full adder is used, (b) shows the case in which a 1-bit batch adder is used, (c) shows the case in which a batch adder using a 3-bit grouping method is used.

FIG. 5 shows the effects of a 3-bit grouping method. With respect to operations in which 9 data items having sufficient numbers of places are added, cases are shown in which a full adder is employed (a), a bit batch addition method which conducts a batch addition of 4 or more bit data is employed (b), and a grouping which conducts a batch addition of bit group comprising 3 connected data method is employed (c).

In the case marked (a), in which a conventional full adder was employed, 1 full adder is required for each part surrounded by a rectangle in the figure, and an addition result and a carry signal is generated for each of these, so that when 9 lines of input have been inputted at the first operation, as many as 6 lines of results remain. After this, although not depicted in the figure, 6 lines are inputted at the second operation and the results of 4 lines are obtained, while 4 lines are inputted at the third operation, and by means of the repetition of this, addition proceeds. The reason for the 9 lines becoming 6 lines, and then becoming 4 lines, is strongly related to the fact that the full adder is a circuit which has 3 inputs and 2 outputs, so that the number of lines is reduced to ⅔ each time.

If the one-bit batch adding method which conducts a batch addition of 4 or more bit data employed in the first embodiment shown in (b) is employed, then since 9 bit data are inputted at the same time and 4 digital signal are outputted 9 lines of inputted data can be reduced to 4 lines at the first addition. This represents a considerable reduction in lines as a result of the batch addition, in comparison with 6 lines in the case in which full adders are employed, so that the addition can be realized at high speed.

When the method which conducts a batch addition of bit group comprising 3 bit data used in the present second embodiment shown in (c) is employed, then the inputted data are employed in 3-bit group units, so that the addition of the 9 lines is such that all the numerical values within the rectangles shown in the figure are inputted and added in batches. For example, by means of the batch addition of 501, the 3-bit-grouped carry component 503, and the 3-bit-grouped addition result 502, are generated. In this manner, 9 item batch adder is a circuit having 9 inputs and 2 outputs, so that it is possible to reduce 9 lines of input data to 2 lines in a single step, and the effects of the bit grouping method are plain.

Figure 6:
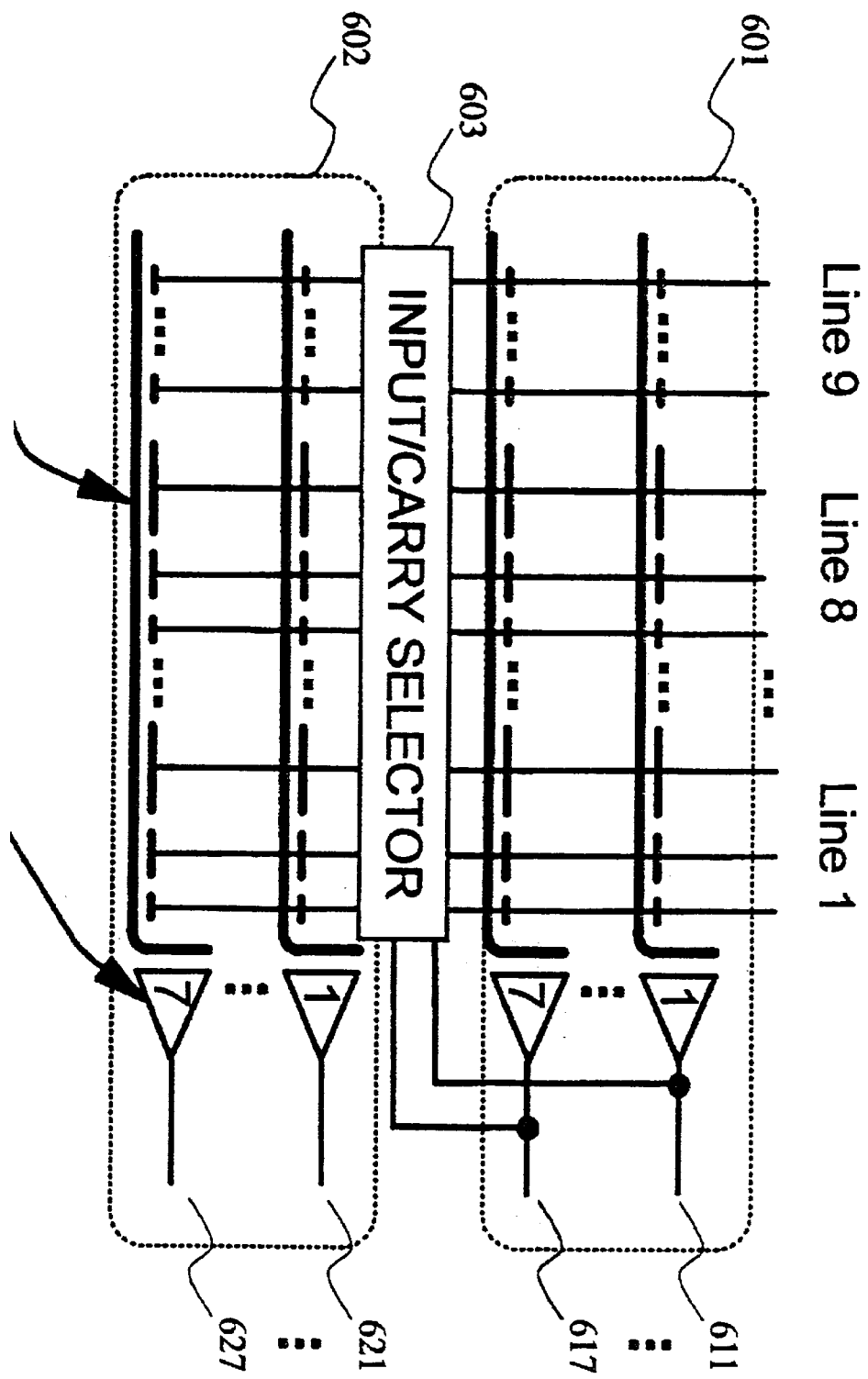
FIG. 6 is a circuit diagram showing a batch adder which conducts the addition of 9-line data which have been arranged into 3-bit groups.

FIG. 6 is a circuit diagram showing a 9-line batch adder which conducts 3-bit grouping. This circuit may be broadly divided into a circuit 601 which converts carry signal (0–7), to digital signal and outputs, termed stage 1, and a part 602 which converts an addition result (0–7) to digital signal and out, which is termed stage 2. The output results of the various stages are given as the number of terminals outputting a value of '1'among the 7 output terminals 611–617 and 621–627. Furthermore, since the addition result of stage 2 is realizedbymeans of the operation (batch addition result carry signal X8), it is necessary to switch the input into stage 2 between the batch addition result and (carry signal=output of stage 1). The switch group for this purpose is the 'input/carry selector' 603. Both stage 1 and stage 2 have essentially the same structure, and comprise 7 logic decision circuits having differing setting threshold values to covert an analog signal to a digital signal, which are shown in the figure by triangles.

Figure 7:
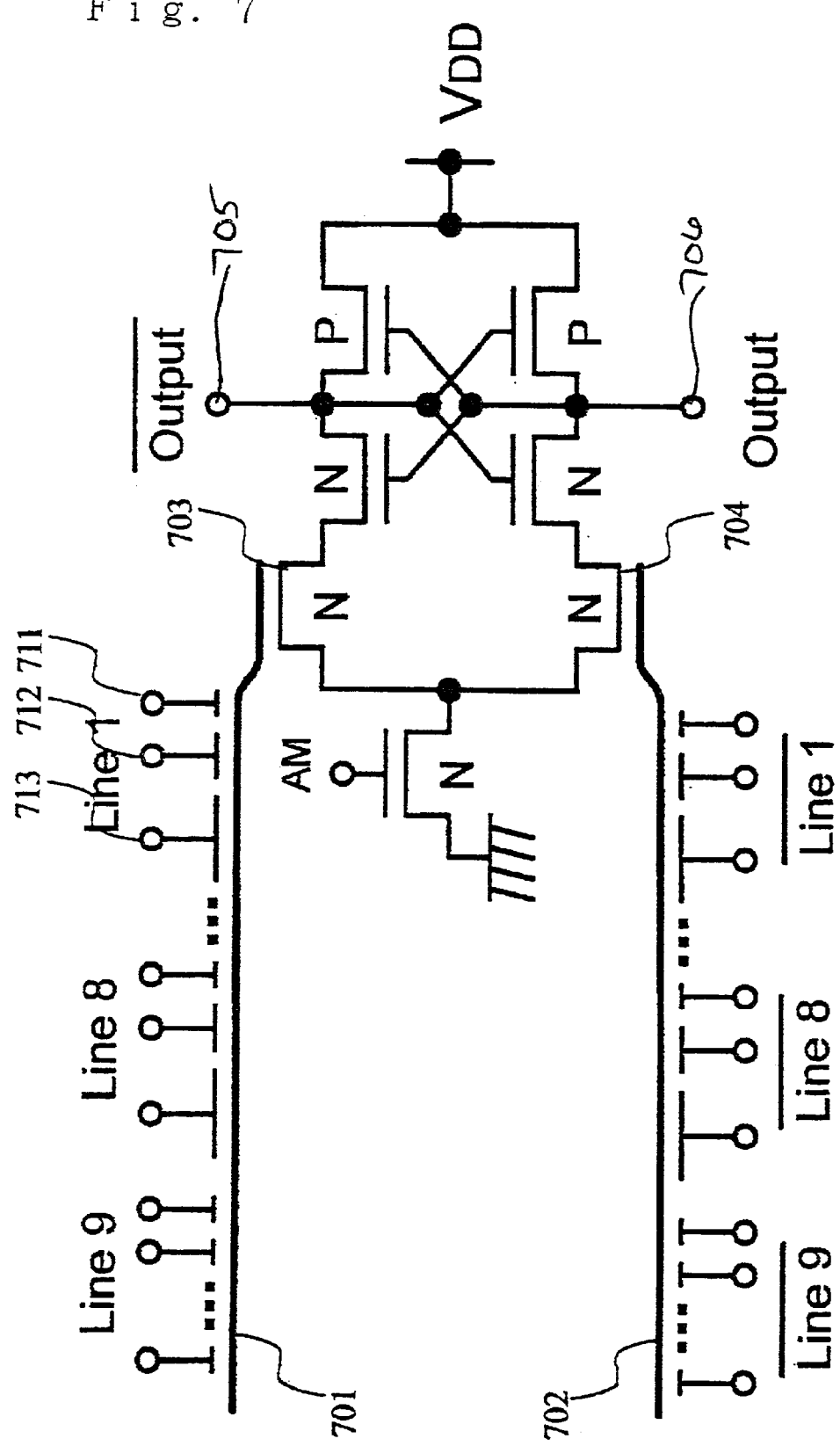
FIG. 7 is a circuit diagram showing the case in which a sense amplifier type neuron MOS circuit is employed in the logic decision circuit of the batch adder shown in FIG. 6.

FIG. 7 shows an example of a neuron MOS sense amplifier type circuit as a operation circuit wherein an output of a first inverter circuit is connected with an input of a second inverter circuit at a first connection point, an output of the second inverter is connected to an input of the first inverter at a second connection point, and a potential difference is generated between the first and the second connection point, based on a voltage signal generated in the floating electrode as the logic decision circuit. The sense amplifier part is identical to that shown in FIG. 4; however, the 4 MOS transistors which were employed as a switch are omitted. The 9 input data, which are grouped into 3-bit groups, are applied to the input terminals so as to have a capacitive coupling ratio of 4:2:1 from the most significant bit in the floating electrode 701 and 702. By means of this, an analog voltage (an offset voltage may be present) given by the addition average having a linear relationship with the batch addition results of input bit group is produced in the floating electrode. This floating electrode forms the gate electrode of neuron MOS transistors 703 and 704, and as a result of the highs and lows of the floating gate electrode potential, the conductance between the source and drain of the neuron MOS transistors changes, and as a result of this conductance, a potential difference is generated between inversion output node 705 (a first connection point) and output node 705 (a second connection point).

The sense amplifier circuit of the present embodiment has a structure such that data is inputted into both neuron MOS transistors; however, a sense amplifier circuit may also be employed in which data is inputted into only one transistor, or a voltage drive type sense amplifier circuit may be employed. Furthermore, the logic decision circuit, a means for conversing an analog signal to a digital signal, may be any type of circuit insofar as it is a circuit capable of conducting a threshold operation based on the analog potential of a floating gate which has a linear relationship with additional result, so that for example, a neuron MOS inverter circuit may be employed.

Figure 8:
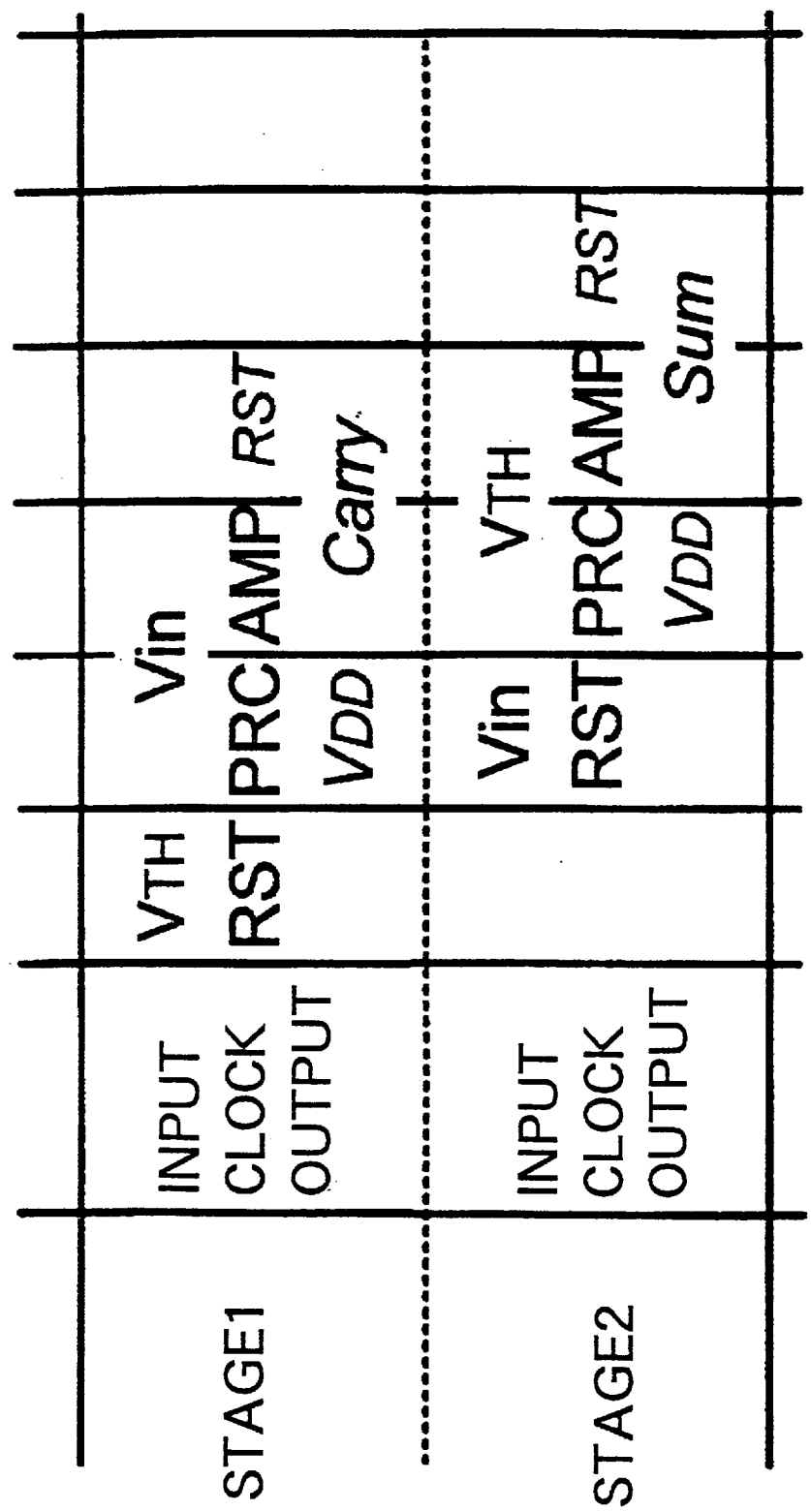
FIG. 8 is a timing chart between stage 1 and stage 2 in the batch adder of FIG. 6.

FIG. 8 is a timing chart which serves to realize subtraction at stage 2. The sense amplifier operates by the repetition of the 3 cycles of resetting (RST), precharging (PRC), and amplification (AMP) (the details of the operation are stated in the patents related to the sense amplifier). With respect to the stage 1, stage 2 operates with a 1 cycle lag, so that pipeline processing is conducted internally.

Figure 9:
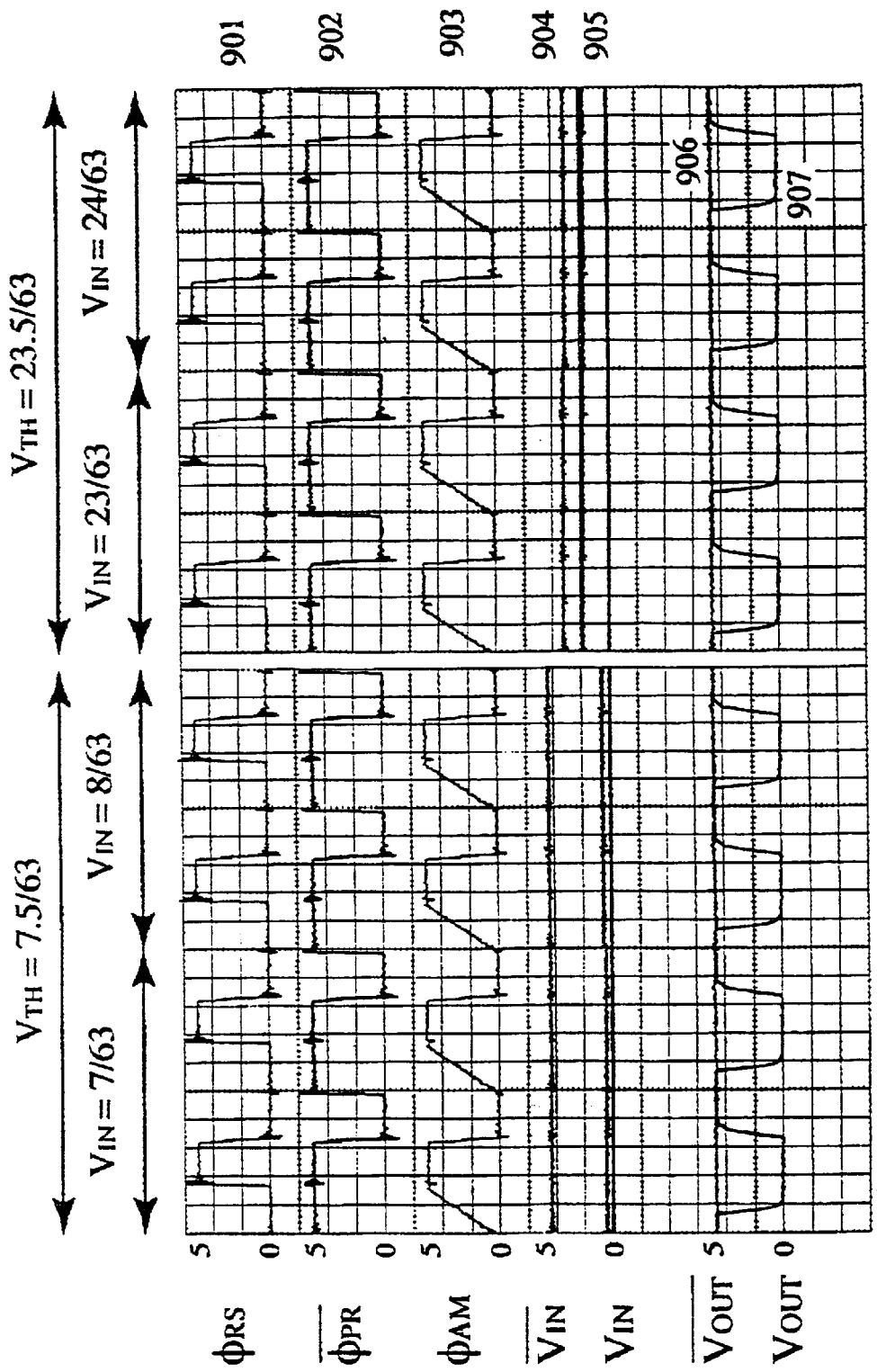
FIG. 9 is a partial operation measurement diagram of the circuit of stage 1 of the batch adder of FIG. 6.

FIG. 9 shows an operating wave forms obtained by a sense amplifier having a threshold value corresponding to 7.5, and a sense amplifier circuit corresponding to 23.5, with respect to the batch addition result (0–63), among the 7 sense amplifiers of stage 1. Wave form 901 is the reset clock wave form, wave form 902 is the precharge clock wave form, and wave form 903 is the amplification clock wave form. Wave forms 904 and 905 are voltages which are inputted; a voltage corresponding to an addition result of 7 and an addition result of 8 were inputted into a circuit corresponding to a threshold value of 7.5, while addition results of 23 and 24 were inputted into a sense amplifier corresponding to a threshold value of 23.5, and a measurement of the correct carrying out of the threshold operation digital conversion was conducted. The measurement results of both output nodes of the sense amplifier are given by 906 and 907. During precharging, both output nodes had a value of $V_{DD}$, and in the next amplification cycle, a determination of the result was conducted, and in the next cycle, this result was latched. That is to say, the portion divided into '0' and '1' indicates the result. The output results were inverted in the case in which '7' was inputted and the case in which '8' was inputted, so that it can be seen that the digital conversion operation was conducted correctly with '7.5' as a threshold value. Furthermore, it can be seen with respect to the threshold value of '23.5' that the results when '23' and '24' are inputted are inverted, so that the threshold operation (digital conversion) was accurately conducted.

Third Embodiment

A third embodiment of the present invention comprises a circuit which conducts the multiplication of addition operations, which is realized at high speed and with a small size by using batch adders. In the present invention, the only embodiment using batch adders which shown is this multiplier; however, this is not limited to adders, and may be employed in image processing or the like.

Figure 10:
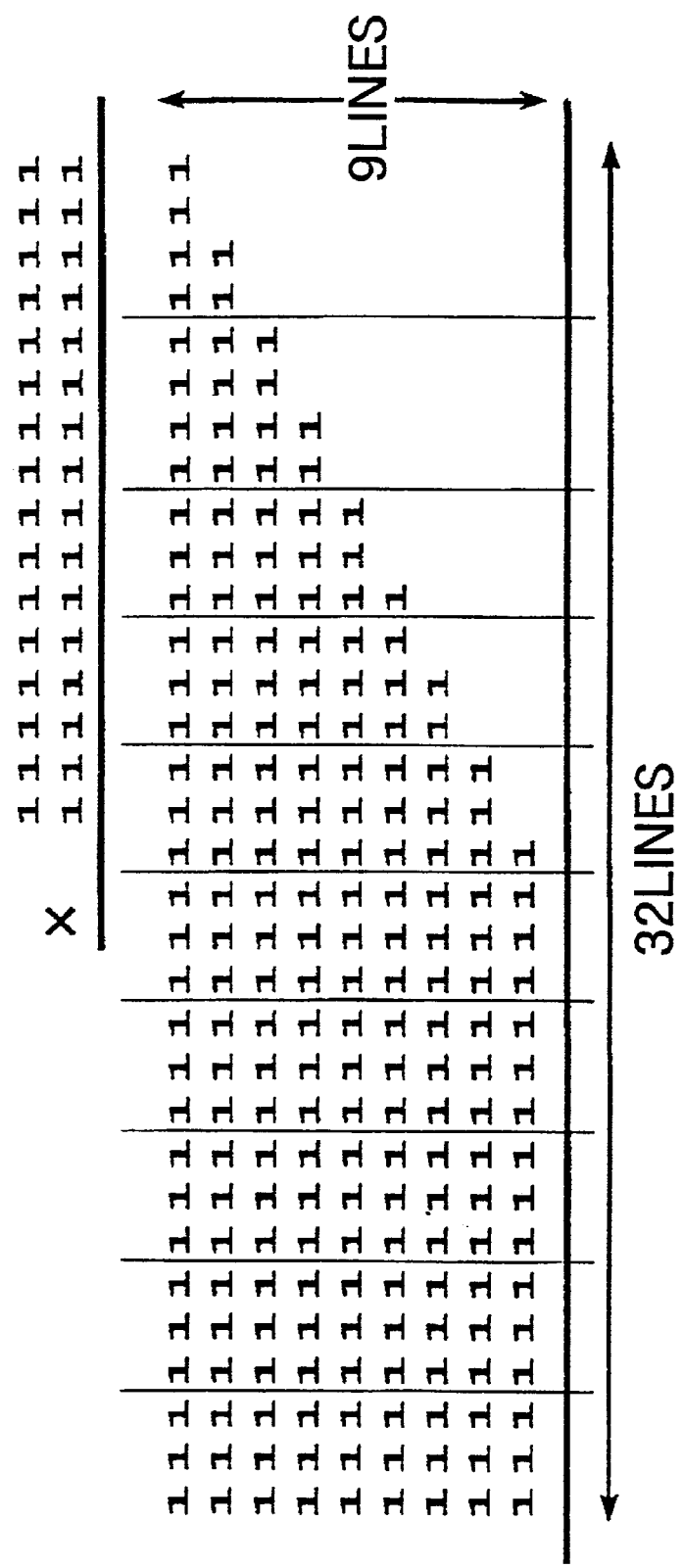
FIG. 10 shows the calculation of a 16-bit multiplier.
Figure 11:
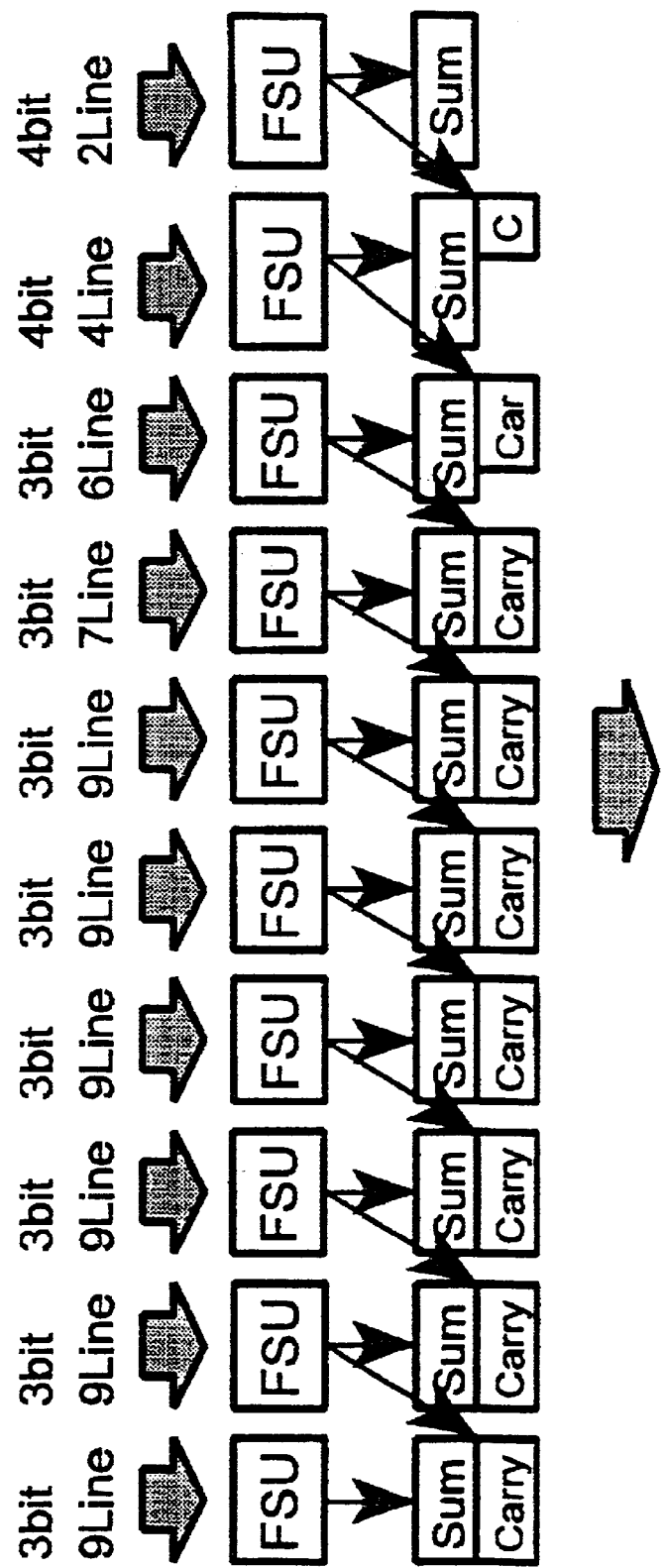
FIG. 11 shows the combination of batch adders of a 16-bit multiplier.

In the case of a 16-bit multiplier, if calculations are developed using the conventionally available method termed the 'Booth Decoder', then it is necessary to develop this in a maximum of 9 lines, as shown in FIG. 10, and to add these at high speed. Using conventional full adders, 5 stages of full adders need to be combined for this addition, causing problems from the point of view of speed and surface area; however, by combining 3-bit 9-line batch adders such as that shown in FIG. 6 in the manner shown in FIG. 11 (in the figure, FSU indicates a batch adder), then the circuit may be realized using a single stage of batch adders.

In the present embodiment, since 3-bit 9-item batch adders are employed, this is limited to a 16-bit multiplier; however, this may be applied to any sort of multiplier insofar as an adder is employed which is capable of performing a single stage batch addition of the number of lines generated by the calculation of the multiplier, so that for example, if a 4-bit 17-item batch adder is employed, a 33-bit multiplier maybe maximally realized.

Figure 12:
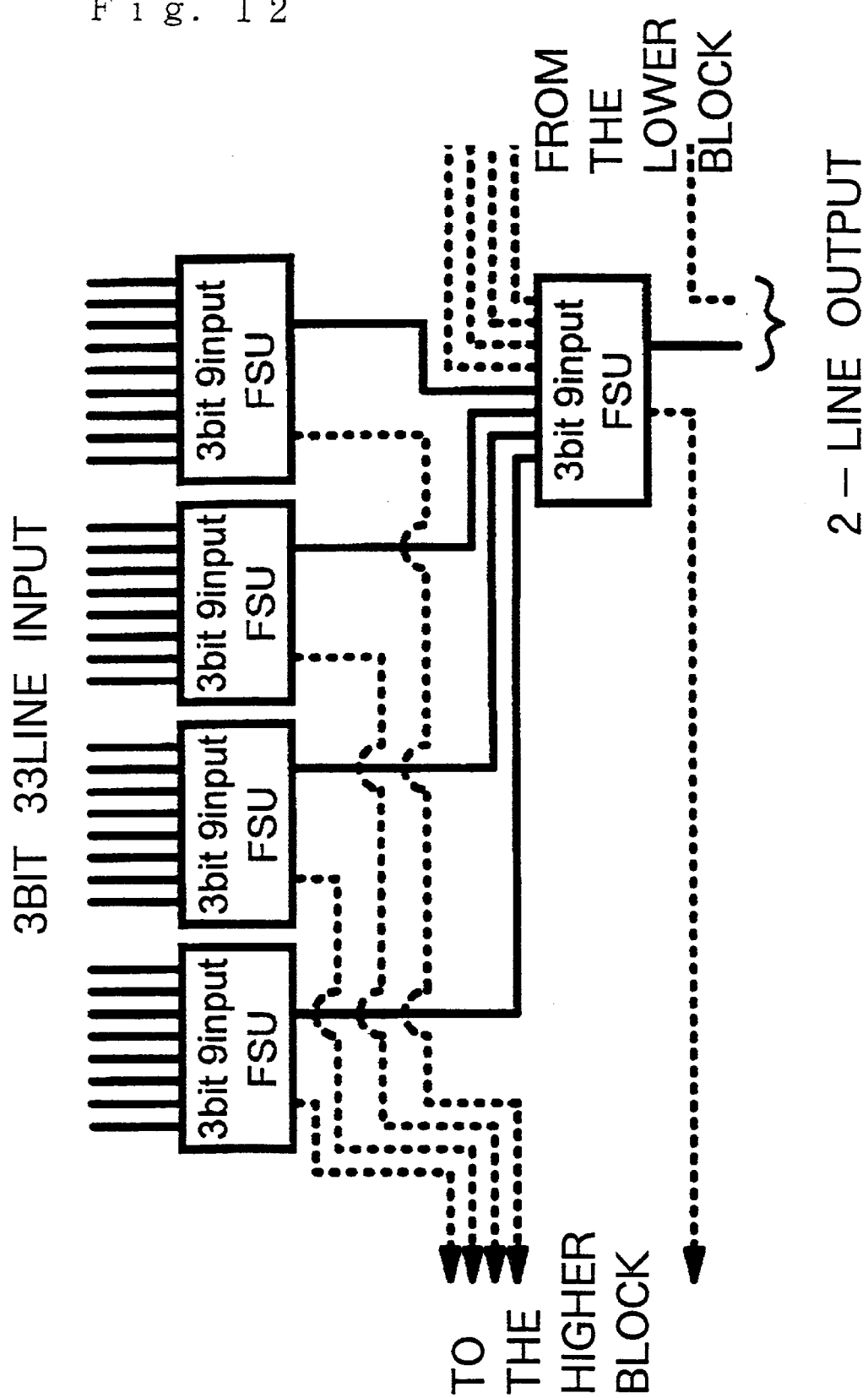
FIG. 12 shows the combination of batch adders which conduct 33-line addition.

Since a maximum of 33 lines can be produced by use of a 'Booth Decoder', if the batch adder of FIG. 7 6 is employed, a 64-bit multiplier may be realized by combining 2 stages of batch adders. This combination is shown in FIG. 12. The continuous addition portion of a 64-bit multiplier may be realized by disposing such a unit at each 3-bit group.

Figure 13:
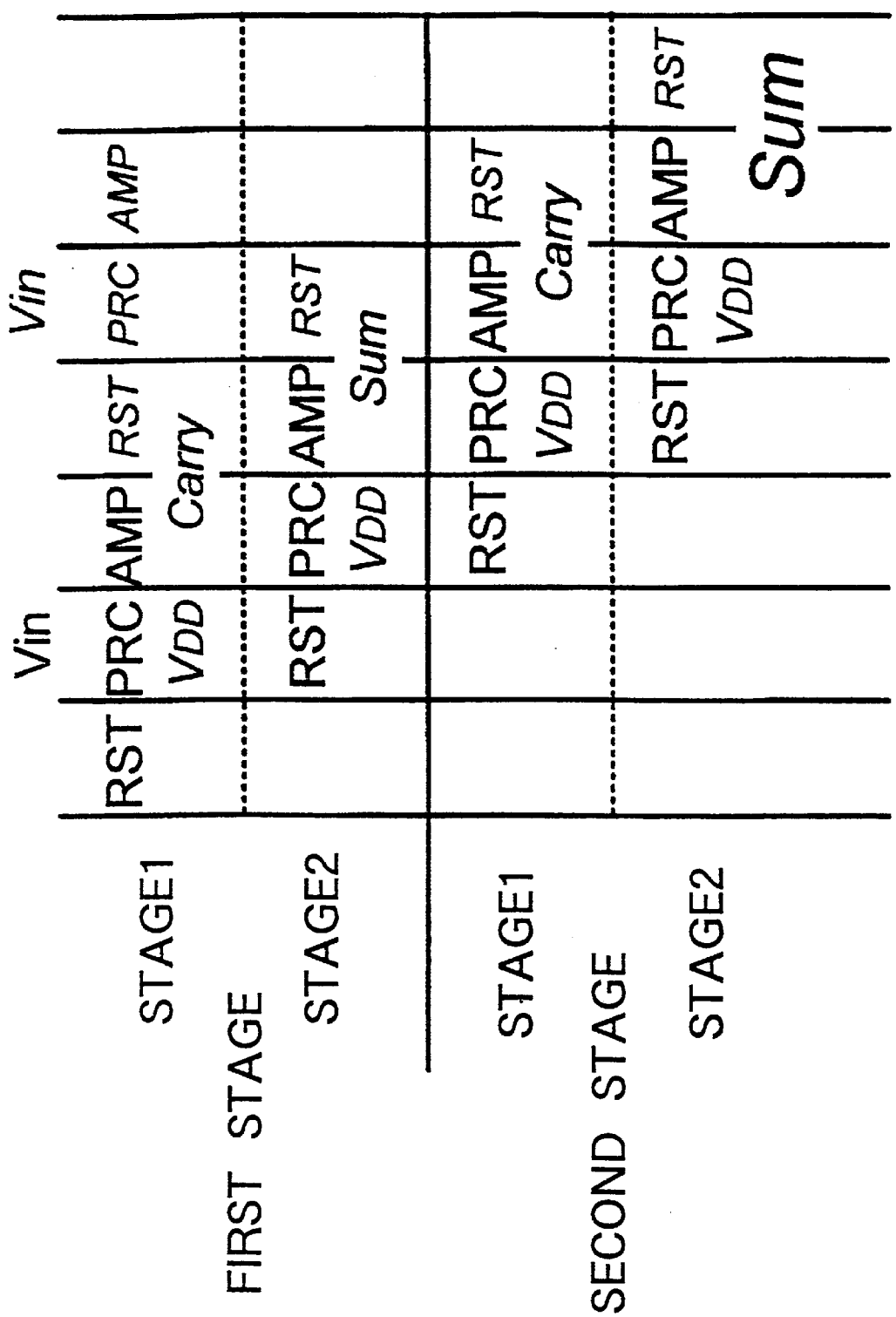
FIG. 13 is a timing chart of the circuit of FIG. 12.

Furthermore, pipeline processing is possible between the batch adders of the first and second stages, and as shown in FIG. 13, operation is conducted with a 1 cycle lag between the first and second stages The memory between the pipelines employs the latch function of the sense amplifier.

The case in which conventional full adders are employed to construct a 64-bit multiplier is shown in FIG. 14; the parameters there of are presented for comparison together with those of the case in which the 7-input 3-output batch adder of FIG. 3 is employed, as a representative of an example of a circuit in which bit blocking is not conducted, and with those of the case in which a 3-bit 9-line batch adder is employed and bit blocking is conducted. The speed indicated is a result obtained in a simulation with respect to a circuit having a 1 micron design rule. The Cap. number shows the size of the vMOS capacity; the minimal input capacity size is set at 1. In the case in which a 7-input 3-output batch adder is employed, both the surface area and the number of stages are smaller than in the case of a CMOS structure; however, there is the problem that the speed is low. The case in which a 3-bit 9-line batch adder circuit is employed realizes the highest speed by means of pipeline processing, and can be realized with approximately ⅓ the number of transistors in comparison with the case of CMOS full adders; however, an extremely large capacity is required. However, one capacity may be smaller than one transistor, and furthermore, by adopting various technologies using DRAM such as the adoption of 3-dimensional structure capacities, and insulating films having a high dielectric constant, and the like, it is possible to minimize the surface area occupied by the capacities, and the circuit scale can be made smaller than that in the case of CMOS full adders. Furthermore, in the CMOS structure, because 3,082 full adders are combined in 8 stages, the wiring necessary occupies an extremely large surface area. Since the number of adders employed when batch adders are used is small, and the arrangement involves the repetition of typical patterns, the wiring between adders is also simple.

In the present embodiment, a 3-bit 9-item batch adder was employed; however, other circuits may be employed, in which any number of bits are blocked or are not blocked, so long as the batch addition method is employed.

EFFECTS OF THE INVENTION

In accordance with the invention, a multiple item addition operation can be processed in a simple manner and at high speed by the adoption of the batch addition method.

In accordance with another embodiment of the invention as stated in claim 2, 1-bit data can be added in a simple manner and at high speed, and furthermore, since there is no weighting of the inputs, the accuracy requirements of the threshold operation of the circuit which converts the analog signal used to a digital signal need not be stringent.

In the invention, since a connected bit series is compiled and processed, the number of lines outputted can be reduced, and a batch addition having a small amount of outputs can be realized, and this contributes to the speed of addition.

In accordance with the invention, the addition average of the voltages can be realized by capacitive coupling, so that addition can be achieved with simple circuitry.

Further, the addition-averaged input can be easily calculated by MOS type transistors.

In accordance with another form the invention as stated in claim 6, since the excess charge stored in the floating electrode can be eliminated via a switch, it is possible to realize a batch adder having multiple inputs which has high reliability.

Furthermore, by means of the switch function, it is possible to realize a subtraction function on the floating gate, so that a simple circuit structure can be realized.

Since the circuit structure involves positive feedback, a binary output of '0' or '1' will always be outputted, so that the problem of the accuracy of the connection to the following stage is solved. Furthermore, since the clock control is simple, this is appropriate for pipeline processing, and this further contributes to an increase in speed.

What is claimed is:

1. A semiconductor arithmetic circuit comprising circuit which conduct the addition of a plurality of data expressed in binary format, comprising:

a means for conducting a batch addition operation with respect to all bit data in the same digit portion of said plurality of data, and generating an analog signal having a linear relationship with the result of said batch addition; and a means for converting said analog signal to a digital signal.

2. A semiconductor arithmetic circuit in accordance with claim 1, wherein said plurality of data comprise (1-bit signals) bit data, and 4 or more of said data are added in a batch manner.

3. A semiconductor arithmetic circuit in accordance with claim 1 wherein a plurality of bit groups comprising a plurality of connected bit data are subjected to batch addition.

4. A semiconductor arithmetic circuit in accordance with claim 1, wherein said means for conducting a batch addition operation and generating said analog signal comprises an electrically floating electrode, a plurality of input terminals connected with said floating electrode via capacities of predetermined size, and a means for inputting predetermined bit data of said data into said input terminals.

5. A semiconductor arithmetic circuit in accordance with claim 4, having at least one MOS type transistor, the ON/OFF state of which is controlled by the potential of said floating electrode.

6. A semiconductor arithmetic circuit in accordance with claim 4, wherein said floating electrode is connected with a signal line having a predetermined potential via at least one switch.

7. A semiconductor arithmetic circuit in accordance with claim 4, wherein an output of a first inverter circuit is connected with an input of a second inverter circuit at a first connection point, an output of said second inverter is connected to an input of first inverter at a second connection point, and based on a voltage signal generated in said floating electrode, a potential difference is generated between said first connection point and said second connection point.

8. A semiconductor arithmetic circuit comprising circuit which conduct the addition of a plurality of data expressed in binary format, comprising:

terminals for the simultaneous input of said plurality of data;

a means for conducting a batch addition operation with respect to all bit data in the same digit portion of said plurality of data, and generating a multi-valued signal having a linear relationship with the result of said batch addition; and a means for converting said multi-valued signal to a digital signal.

* * * * *